US012665689B2

(12) United States Patent (10) Patent No.: US 12,665,689 B2
Ouellette et al. (45) Date of Patent: Jun. 23, 2026

(54) PRECISION TIME PROTOCOL REDUNDANCY AND LOAD BALANCING ACROSS A SET OF ACTIVE TIME SERVERS

(71) Applicant: META PLATFORMS, INC., Menlo Park, CA (US)

(72) Inventors: Michel Ouellette, Sunnyvale, CA (US); Patrick Cullen, Dublin (IE); Oleg Obleukhov, Dublin (IE); Alexander Bulimov, Cabinteely (IE)

(73) Assignee: META PLATFORMS, INC., Menlo Park, CA (US)

( * ) Notice: Subject to any disclaimer, the term of this patent is extended or adjusted under 35 U.S.C. 154(b) by 543 days.

(21) Appl. No.: 18/130,792

(22) Filed: Apr. 4, 2023

(65) Prior Publication Data

US 2024/0340100 A1 Oct. 10, 2024

(51) Int. Cl.
*H04J 3/00* (2006.01)
*H04J 3/06* (2006.01)
*H04L 47/125* (2022.01)

(52) U.S. Cl.
CPC .......... *H04J 3/0641* (2013.01); *H04J 3/0673* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 9,460,183 B2 | 10/2016 | Dalton | |
| 9,690,674 B2 | 6/2017 | Cui et al. | |
| 9,819,541 B2 | 11/2017 | Garg et al. | |
| 10,178,636 B2 | 1/2019 | Zhang et al. | |
| 11,197,075 B1 * | 12/2021 | Kamen | H04L 43/0817 |
| 2018/0145821 A1 * | 5/2018 | Pietiläinen | H04J 3/0641 |
| 2021/0028876 A1 * | 1/2021 | Beardsley | H04J 3/0641 |

OTHER PUBLICATIONS

Technical Committee on Sensor Technology (TC-9), "IEEE Standard for a Precision Clock Synchronization Protocol for Networked Measurement and Control Systems," IEEE Instrumentation and Measurement Society, IEEE Std 1588™-2008, Mar. 27, 2008, 289 pages.

(Continued)

*Primary Examiner* — Gerald A Smarth
(74) *Attorney, Agent, or Firm* — EVERSHEDS SUTHERLAND (US) LLP

(57) ABSTRACT

A system for achieving Precision Time Protocol (PTP) redundancy and load balancing across a set of active time servers deployed in a cluster is disclosed. The system may organize a set of PTP Grandmasters (GMs) (e.g., located in a datacenter) into a plurality of PTP clusters (e.g., for load balancing). A set of PTP ordinary clocks (OCs) (e.g., time clients) may be grouped in OC Groups and then into PTP clusters for GM assignation, wherein each PTP OC includes a unicast master table (UMT) that includes one or more potential PTP GM port addresses and priority values. Based on a Master Clock Mechanism, one of the potential GMs may be selected based on one or more PTP GM priority attributes.

20 Claims, 12 Drawing Sheets

(56)  References Cited

OTHER PUBLICATIONS

Technical Committee on Sensor Technology (TC-9), "IEEE Standard for a Precision Clock Synchronization Protocol for Networked Measurement and Control Systems," IEEE Instrumentation and Measurement Society, IEEE Std 1588™-2019, Nov. 7, 2019, 499 pages.

ITU-T., "Precision Time Protocol Telecom Profile for Frequency Synchronization," ITU-T G.8265.1/Y.1365.1—International Telecommunication Union, Jun. 2021, 36 pages.

Korkee A., "Time Synchronization Redundancy in PTP Networks," Tampere University—Master of Science Thesis, Apr. 2020, 79 pages.

"Synchronization for Next Generation Networks—The PTP Telecom Profile," White Paper, Microsemi, 2011-2017, 19 pages.

* cited by examiner

300

90

Communications Network
12

97   Network Adapter

93   ROM

82   RAM

92   Memory Controller

80

96   Display Controller

86

85

83   Peripherals Controller

84

95

94

91   Processor

81   Co-processor

Figures 4A, 4B:
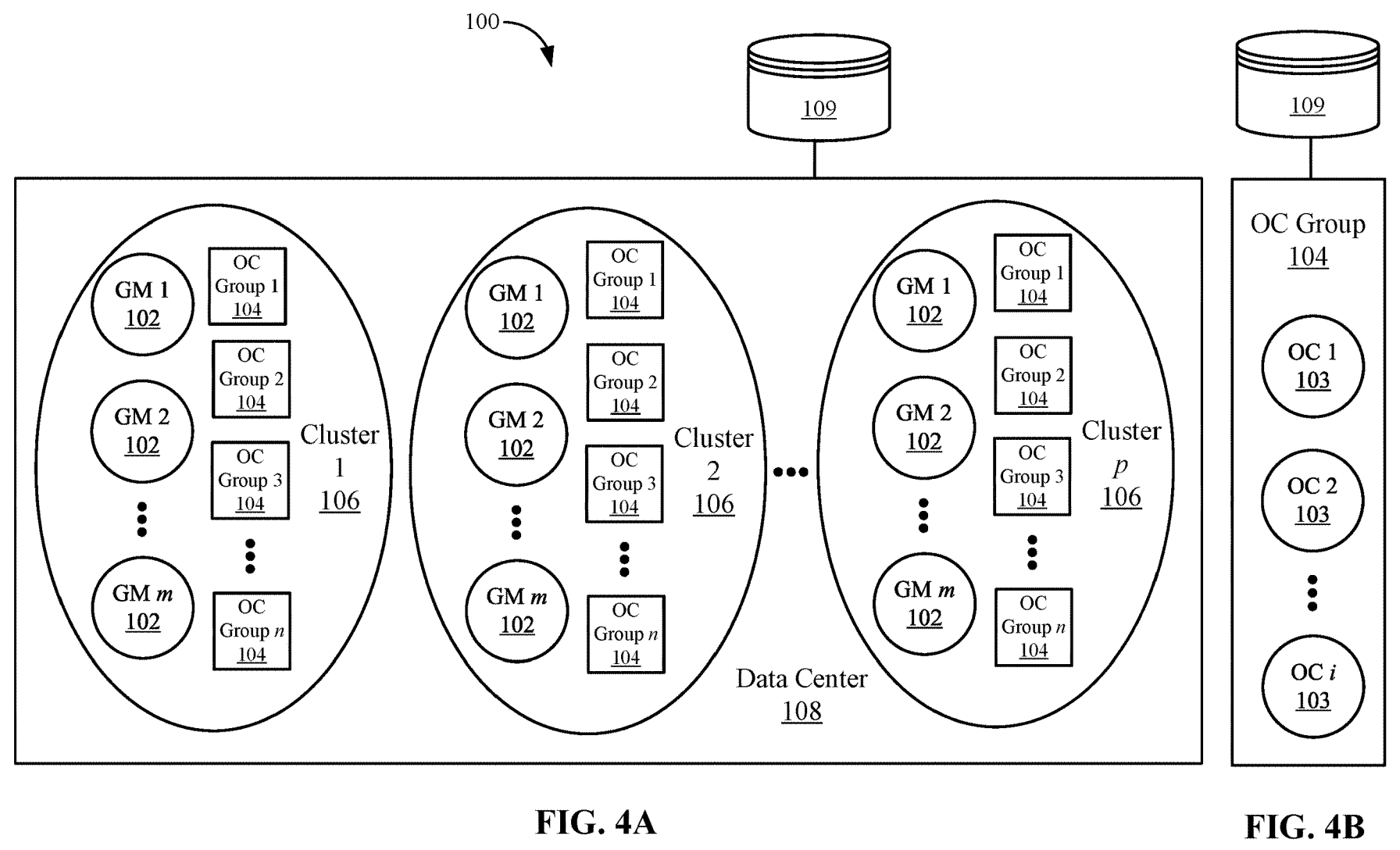

100

OC Group 104

Cluster p 106

OC Group 1 104    OC Group 2 104    OC Group 3 104    • • •    OC Group n 104

GM 1 102    GM 2 102    • • •    GM m 102

Cluster 2 106

OC Group 1 104    OC Group 2 104    OC Group 3 104    • • •    OC Group n 104

GM 1 102    GM 2 102    • • •    GM m 102

Cluster 1 106

OC Group 1 104    OC Group 2 104    OC Group 3 104    • • •    OC Group n 104

GM 1 102    GM 2 102    • • •    GM m 102

Data Center 108

| Index of potential GMs 112 | portAddress (IPv6) 115 | priority 117 |
|---|---|---|
| 1  102 | address_1  114 | p₁ 116 |
| 2  102 | address_2  114 | p₂ 116 |
| …  102 | …  114 | …  116 |
| i  102 | address_i  114 | pᵢ 116 |

111

200

| Index of potential GMs 112 | portAddress (IPv6) 115 | GmPriority 119 |
|---|---|---|
| 1 102 | address_1 114 | p1 118 |
| 2 102 | address_2 114 | p2 118 |
| ... 102 | ... 114 | ... 118 |
| i 102 | address_i 114 | pi 118 |

180

| Index of potential GMs 112 | GM clockIdentity 183 | | GmPriority 119 | |
|---|---|---|---|---|
| 1  102 | clockIdentity_1 | 182 | p₁ | 118 |
| 2  102 | clockIdentity_2 | 182 | p₂ | 118 |
| ...  102 | ... | 182 | ... | 118 |
| i  102 | clockIdentity_i | 182 | pᵢ | 118 |

Determine a PTP cluster for load balancing, the PTP clusters comprising PTP Grandmasters (GMs) and PTP ordinary clock (OC) groups
1210

Determine the PTP cluster corresponds to a PTP OC and the PTP OC corresponds to a PTP OC group of the PTP OC groups, wherein the PTP OC comprises a unicast master table (UMT) and the UMT comprises port addresses associated with one or more of the PTP GMs and one or more PTP GM priority attributes
1220

Determine for the PTP OC, by a best master clock algorithm (BMCA) based on the one or more PTP GM priority attributes, a first PTP GM of the PTP GMs
1230

Synchronize, based on the first PTP GM, the time for the PTP connections within the network
1240

FIG. 12

PRECISION TIME PROTOCOL REDUNDANCY AND LOAD BALANCING ACROSS A SET OF ACTIVE TIME SERVERS

TECHNOLOGICAL FIELD

Aspects of this disclosure may relate generally to methods, apparatuses and computer program products for synchronizing clock throughout a computer network.

BACKGROUND

Precision Time Protocol (PTP) is a protocol used to synchronize clocks throughout a computer network, e.g., as defined by Institute of Electrical and Electronics Engineers (IEEE) 1588 Standard for a Precision Clock Synchronization Protocol for Networked Measurement and Control Systems. For example, PTP is currently employed to synchronize financial transactions, mobile phone tower transmissions, sub-sea acoustic arrays, and networks. Synchronization and management of a PTP system is achieved through the exchange of messages across the communications medium. However, PTP specifications are silent regarding achieving high levels of redundancy under failure scenarios while at the same time equally load balancing a large number of PTP connections between Ordinary Clocks (OCs) (e.g., Open Time Clients) and a set of active Grandmasters (GMs) (e.g., Open Time Servers).

BRIEF SUMMARY

Aspects are described for achieving PTP redundancy and load balancing across a set of active time servers deployed in a cluster.

According to some aspects, a set of PTP GMs (e.g., located in a datacenter) may be organized into a plurality of PTP clusters (e.g., for load balancing). According to some aspects, a set of PTP OCs (e.g., time clients) may be grouped together into PTP clusters for GM assignation, wherein each PTP OC includes a unicast master table (UMT) that contains one or more potential PTP GM port addresses. Based on the PTP Best Master Clock Algorithm (BMCA) (e.g., IEEE Std 1588-2008, IEEE Std 1588-2019), also referred to herein as Master Clock Mechanism or Best Master Clock Mechanism, one of the potential GMs may be selected based on its attributes (e.g., priority1, clock class, clock accuracy, off-set scaled log-variance, priority2, and clock identity). A plurality of GM priorities may be added to the UMT. For example, each of the plurality of GM priorities may be associated with one of the potential GMs (e.g., a lower value of priority may be higher ranked for connecting an OC to a potential GM).

Each OC may request (e.g., based on the priority associated with each one of the potential GMs) a unicast announce message (e.g., request_unicast_transmission TLV) from a GM (e.g., where the first GM has a highest priority specified within its UMT). Based on the priority associated with each one of the potential GMs, an OC may select a respective GM for time synchronization. The OC may select another potential GM based on the priority list until the selected respective GM fails.

According to some aspects, each UMT may include a pointer (e.g., to a IPv4/IPv6 address or port). Based on the pointer, each PTP OC may choose a unique GM network address. According to some aspects, each PTP OC may request announce messages from all potential GMs within the associated UMT to be analyzed by the BMCA (e.g., dynamic request). The BMCA may be modified to an alternate BMCA (A-BMCA) that uses a new attribute (e.g., "GmPriority" attribute) having a table of GM priorities for dynamically selecting one of the potential GM. In some examples, the A-BMCA may also be referred to herein as alternate Master Clock Mechanism or alternate Best Master Clock Mechanism. The table of GM priorities may be implemented via the UMT or a clock identity table. The A-BMCA may select a GM by comparing default PTP attributes, in addition to, the GM priority attribute value.

According to some aspects, the OCs may request announce messages from the remaining GMs when the actual GM fails and the associated responses to the requested announce messages may provide information about new available GMs for connection. Moreover, the OCs may request announce messages from all GMs at certain specified time intervals for obtaining information when a previously failed GM has already recovered.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary aspects of the disclosed subject matter; however, the disclosed subject matter is not limited to the specific methods, compositions, and devices disclosed. In addition, the drawings are not necessarily drawn to scale. In the drawings:

FIG. 4A is a diagram illustrating GMs and OCs in accordance with aspects of the disclosure.

FIG. 4B is a diagram illustrating OCs of an OC group in accordance with aspects of the disclosure.

FIG. 11 is a diagram illustrating a clock identity table in accordance with aspects of the disclosure.

FIG. 12 is an example method for achieving redundancy and load-balancing when synchronizing time for PTP connections within a network in accordance with aspects of the disclosure.

Figure 1:
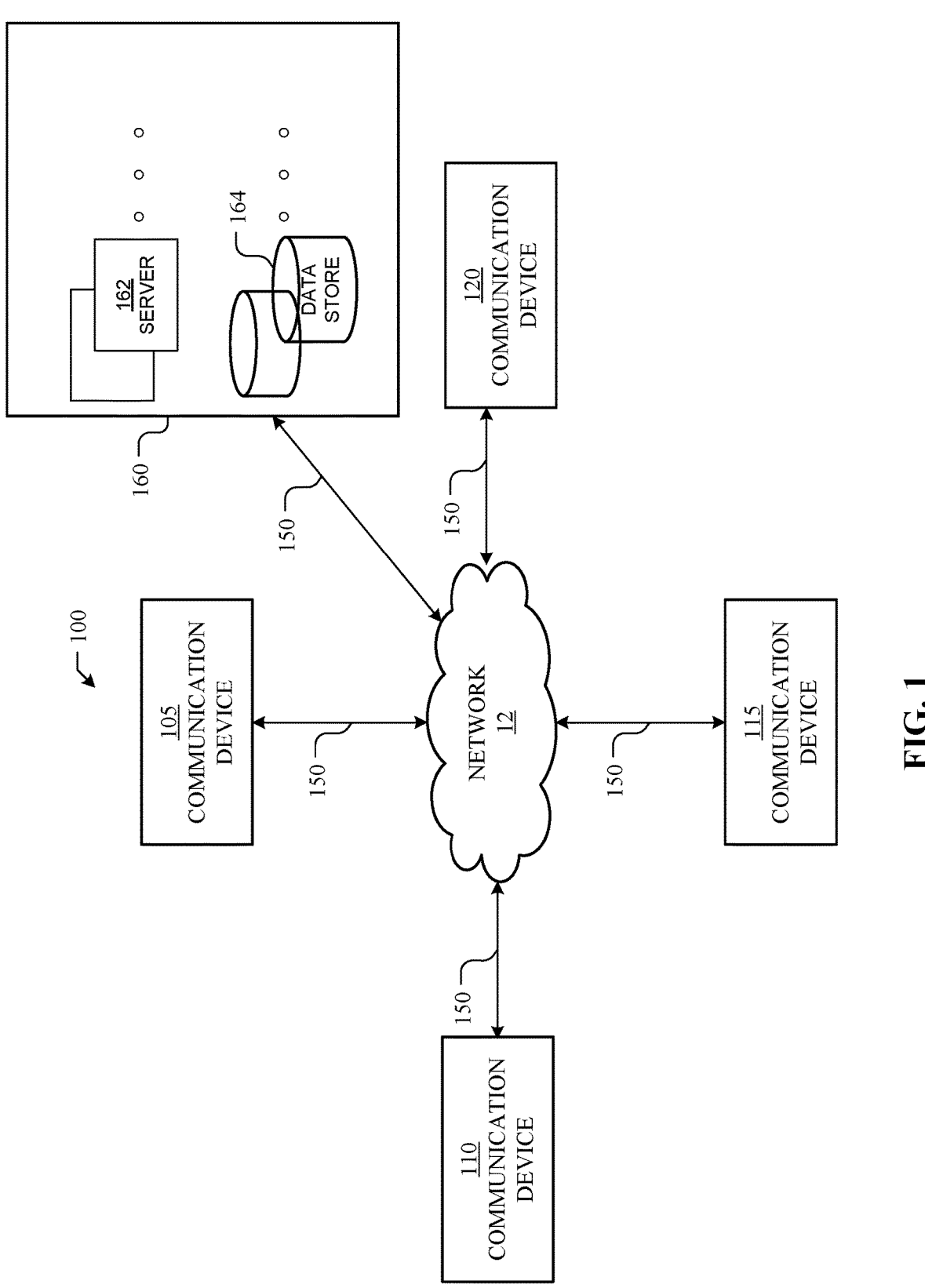
FIG. 1 is a diagram of an exemplary network environment in accordance with an exemplary embodiment.

The figures depict various embodiments for purposes of illustration only. One skilled in the art will readily recognize from the following discussion that alternative aspects of the structures and methods illustrated herein may be employed without departing from the principles described herein.

DETAILED DESCRIPTION

Various aspects of the disclosed subject matter include methods, systems, and computer program products for achieving redundancy and load-balancing when synchronizing time for PTP connections within a network. A set of PTP GMs (e.g., located in a datacenter) may be organized into PTP clusters for load balancing. Moreover, a set of PTP OCs (e.g., time clients implemented into servers) may be organized and grouped into PTP clusters for GM assignment. Each OC may include a UMT that contains potential GM port addresses. The UMT may perform a BMCA to select one of the potential GMs based on their attributes (e.g., priority1, clock class, clock accuracy, offset scaled log-variance, priority2, clock identity, etc.). In order to achieve high levels of redundancy under failure scenarios, while at the same time balancing a larger number of PTP connections between OCs and a set of active GMs, this solution may be composed of a first method and/or a second method.

The first method may include adding a list of GM priorities within the UMT where the value of the entry on the list is the priority for the potential GMs (e.g., a lower or lowest value of priority is preferred for connecting). Each OC UMT may point to a different port (e.g., GM IPv4/IPv6 address) which may enable the OCs to choose a different GM. Further, each OC may request unicast announce messages (e.g., request unicast transmission TLV) from only the GMs with the first ranked priority (e.g., the priority is specified within the UMT). The OC may rank and/or select the respective GM, based on the priority list, for time synchronization. The OC may also rank and/or select a backup GM until the actual selected GM fails, based on the priority list.

The second method may include using each OC to request announce messages from multiple potential GMs within their associated UMT (e.g., dynamic request). The received announce messages may then be analyzed by the BMCA. The BMCA may be modified to an alternate BMCA (A-BMCA), which may use a new attribute (e.g., GmPriority attribute) that may include a table of GM priorities for ranking and selecting the potential GM dynamically. The table of GM priorities may be implemented via the UMT or clock identity. The OCs may request announce messages from the remaining GMs when the actual GM fails. These request announce messages may enable the OCs to obtain information regarding new available GMs for possible connection. The OCs (using the A-BMCA) may select a new redundant GM by comparing GM priority. The OCs may also request announce messages from GMs (e.g., at specified time intervals) for obtaining information when a previously failed GM has already recovered.

Various aspects of the disclosed subject matter may be embodied in many different forms and should not be construed as limited to the aspects set forth herein. Like reference numerals refer to like elements throughout. As used herein, the terms "data," "content," "information" and similar terms may be used interchangeably to refer to data capable of being transmitted, received and/or stored in accordance with disclosed subject matter. Moreover, the term "exemplary", as used herein, is not provided to convey any qualitative assessment, but instead merely to convey an illustration of an example. Thus, use of any such terms should not be taken to limit the spirit and scope of aspects of the disclosed subject matter.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

It is to be understood that the methods and systems described herein are not limited to specific methods, specific components, or to particular implementations. It is also to be understood that the terminology used herein is for the purpose of describing particular embodiments only and is not intended to be limiting.

Reference is now made to FIG. 1, which is a block diagram of a system according to exemplary embodiments. As shown in FIG. 1, the system 100 may include one or more communication devices 105, 110, 115 and 120 and a network device 160. Additionally, the system 100 may include any suitable network such as, for example, network 12. As an example and not by way of limitation, one or more portions of network 12 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 12 may include one or more networks 12.

Links 150 may connect the communication devices 105, 110, 115 and 120 to network 12, network device 160 and/or to each other. This disclosure contemplates any suitable links 150. In some exemplary embodiments, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In some exemplary embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout system 100. One or more first links 150 may differ in one or more respects from one or more second links 150.

In some exemplary embodiments, communication devices 105, 110, 115, 120 may be electronic devices including hardware, software, or embedded logic components or a combination of two or more such components and capable of carrying out the appropriate functionalities implemented or supported by the communication devices 105, 110, 115, 120. As an example, and not by way of limitation, the communication devices 105, 110, 115, 120 may be a computer system such as for example a desktop computer, notebook or laptop computer, netbook, a tablet computer (e.g., a smart tablet), e-book reader, Global Positioning System (GPS) device, camera, personal digital assistant (PDA), handheld electronic device, cellular telephone, smartphone, smart glasses, augmented/virtual reality device, smart watches, charging case, or any other suitable electronic device, or any suitable combination thereof. The communication devices 105, 110, 115, 120 may enable one or more users to access network 12. The communication devices 105, 110, 115, 120 may enable a user(s) to communicate with other users at other communication devices 105, 110, 115, 120.

Network device 160 may be accessed by the other components of system 100 directly or via network 12. As an example and not by way of limitation, communication devices 105, 110, 115, 120 may access network device 160 using a web browser or a native application associated with network device 160 (e.g., a mobile social-networking application, a messaging application, another suitable application, or any combination thereof) directly or via network 12. In particular exemplary embodiments, network device 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular exemplary embodiments, each server 162 may include hardware, software, or embedded logic components or a combination of two or more such components for carrying out the appropriate functionalities implemented and/or supported by server 162. In particular exemplary embodiments, network device 160 may include one or more data stores 164. Data stores 164 may be used to store various types of information. In particular exemplary embodiments, the information stored in data stores 164 may be organized according to specific data structures. In particular exemplary embodiments, each data store 164 may be a relational, columnar, correlation, or other suitable database. Although this disclosure describes or illustrates particular types of databases, this disclosure contemplates any suitable types of databases. Particular exemplary embodiments may provide interfaces that enable communication devices 105, 110, 115, 120 and/or another system (e.g., a third-party system) to manage, retrieve, modify, add, or delete, the information stored in data store 164.

Network device 160 may provide users of the system 100 the ability to communicate and interact with other users. In particular exemplary embodiments, network device 160 may provide users with the ability to take actions on various types of items or objects, supported by network device 160. In particular exemplary embodiments, network device 160 may be capable of linking a variety of entities. As an example and not by way of limitation, network device 160 may enable users to interact with each other as well as receive content from other systems (e.g., third-party systems) or other entities, or to allow users to interact with these entities through an application programming interfaces (API) or other communication channels.

It should be pointed out that although FIG. 1 shows one network device 160 and four communication devices 105, 110, 115 and 120 any suitable number of network devices 160 and communication devices 105, 110, 115 and 120 may be part of the system of FIG. 1 without departing from the spirit and scope of the present disclosure.

Figure 2:
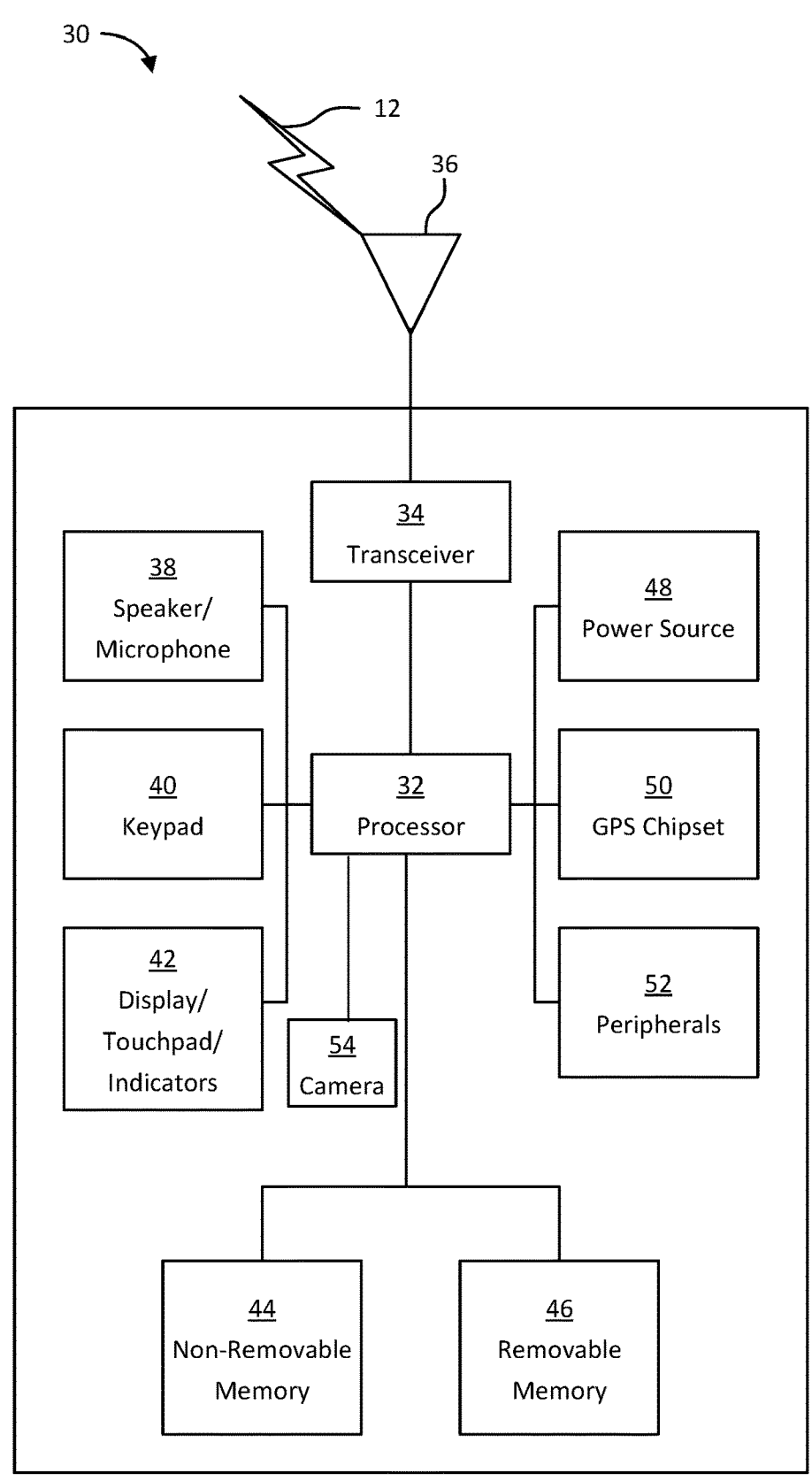
FIG. 2 is a diagram of an exemplary communication device in accordance with an exemplary embodiment.

FIG. 2 illustrates a block diagram of an exemplary hardware/software architecture of a communication device such as, for example, user equipment (UE) 30. In some exemplary embodiments, the UE 30 may be any of communication devices 105, 110, 115, 120. In some exemplary embodiments, the UE 30 may be a computer system such as for example a desktop computer, notebook or laptop computer, netbook, a tablet computer (e.g., a smart tablet), e-book reader, GPS device, camera, personal digital assistant, handheld electronic device, cellular telephone, smartphone, smart glasses, augmented/virtual reality device, smart watch, charging case, or any other suitable electronic device. As shown in FIG. 2, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The power source 48 may be capable of receiving electric power for supplying electric power to the UE 30. For example, the power source 48 may include an alternating current to direct current (AC-to-DC) converter allowing the power source 48 to be connected/plugged to an AC electrical receptable and/or Universal Serial Bus (USB) port for receiving electric power. The UE 30 may also include a camera 54. In an exemplary embodiment, the camera 54 may be a smart camera configured to sense images/video appearing within one or more bounding boxes. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an exemplary embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another exemplary embodiment, the transmit/receive element 36 may be configured to transmit and/or receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other exemplary embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an exemplary embodiment.

Figure 3:
FIG. 3 is a diagram of an exemplary computing system in accordance with an exemplary embodiment.

FIG. 3 is a block diagram of an exemplary computing system 300. In some exemplary embodiments, the network device 160 may be a computing system 300. The computing system 300 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 300 to operate. In many workstations, servers, and personal computers, central processing unit 91 may be implemented by a single-chip CPU called a micro-processor. In other machines, the central processing unit 91 may comprise multiple processors. Coprocessor 81 may be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 300 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus. In an exemplary embodiment, the computing system 300 may include a binary serialization module 98. The binary serialization module 98 may utilize an identifier (ID) based binary serialization protocol associated with a data structure and may generate a schema (e.g., a model) and may assign one or more IDs to one or more fields of data messages in a stable/durable manner. In this regard, in some examples, the assigning of IDs to one or more fields of data messages, stored in a memory device, for a particular schema may not change. In other examples, the assigning of IDs to one or more fields of data messages, stored in a memory device, for a particular schema may be changed. The data structure may be composed of fields and each of the fields may have a unique integer identifier, a type, a name and/or an optional default value. The data (e.g., data structures of messages) generated by the binary serialization module 98 may be in a binary format. In this regard, based on the binary serialization module 98 utilizing the binary serialization protocol when communicating with one or more communication devices, the computing system 300 may enable the one or more communication devices to understand the data (e.g., messages) being communicated in an efficient and reliable manner.

Memories coupled to system bus 80 include RAM 82 and ROM 93. Such memories may include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 300 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 300. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 300 may contain communication circuitry, such as for example a network adaptor 97, that may be used to connect computing system 300 to an external communications network, such as network 12 of FIG. 2, to enable the computing system 300 to communicate with other nodes (e.g., UE 30) of the network.

Some aspects may provide a scheme to achieve GM redundancy, e.g., where the GMs are organized in groups and are all active (i.e., providing synchronization) and the OCs are also organized in groups (i.e., receiving synchronization). As illustrated in FIG. 4A, a number (e.g., m) of GMs 102 (e.g., GM 1, GM 2, . . . and GM m) and a number (e.g., n) OC groups 104 (e.g., OC Group 1, OC Group 2, . . . and OC Group n) may be organized into a number (e.g., p) of Clusters 106 (e.g., Cluster 1, Cluster 2, . . . and Cluster p) of a data center 108. As illustrated in FIG. 4B, each OC Group 104 may include one or more OCs 103 (e.g., OC 1, OC 2, . . . , OC i). As an example, GMs 102 and OCs 103 of data center 108 may be organized into 4 clusters 106, with 4 GMs 102 and 24 OC groups 104 per cluster 106.

Equal distribution of PTP connections from multiple OCs 103 may be achieved across the set of active GMs (e.g., GMs 102) that are part of a cluster 106. In the case of a GM failure (e.g., due to a software crash or power supply failure), the OCs (e.g., OCs 103) that the GM was synchronizing may be redistributed among the remaining active GMs (e.g., GMs 102) within the cluster (e.g., each OC may switch to one of the remaining GMs). The redistribution of PTP connections between the OCs (e.g., 103) and GMs (e.g., GMs 102) may be done in such a way that the number of OCs (e.g., OCs 103) synchronized by a GM is as uniform as possible across all the remaining active GMs (e.g., GMs 102) in a cluster 106. Conventional standards (e.g., IEEE 1588-2019) cannot achieve such functionality using current definitions of PTP.

According to some aspects, a new member may be added to a Unicast Master Table (UMT) (e.g., unicastDiscovery-PortDS). The new member may comprise an array of priorities that an OC uses in choosing the respective GM to synchronize to. According to some aspects, the array of priorities may allow OCs (e.g., OCs 103) to consider a GM differently in the BMCA, which is not a present feature of the UMT as defined in IEEE 1588. Moreover, the priorities may be pre-computed in advance and statically configured to achieve equal distribution. According to some aspects, the parameters of the default BMCA (e.g., clock Class, priority 1, etc.) may be assumed to have the same values across the set of GMs 102 within the cluster.

According to some aspects, a priority database 109 may populate information into the GMs and/or the OC Groups 104 (e.g., including calculating and/or populating priority values). For example, the values of the priorities configured in the UMT may be populated based on data received from the priority database 109 (e.g., a computer system or controller outside the PTP network). Moreover, the values of the priorities may also be re-computed and dynamically configured.

According to some aspects, an array of priorities may be added to a new table (e.g., GmPriority) that may be used for data set comparison by the BMCA. For example, an alternate BMCA (A-BMCA) may be implemented. Since the GmPriority table values can be different in each OC, the GM chosen by each OC after the A-BMCA has been invoked can then be different. Moreover, all other attributes of the A-BMCA may have the same values across the set of GMs (e.g., GMs 102) within the cluster.

According to some aspects, in the general case of a number of N GMs (e.g., GMs 102) in data center 108, equal redistribution of the OC groups (e.g., OC groups 104) may be achieved if the number of OC groups (e.g., OC groups 104) is N! in data center 108. For example, equal distribution may be obtained up to (N-1) GM failures. Moreover, if the total number of OCs (e.g., OCs 103) is M in data center 108, the number of OCs (e.g., OCs 103) per group is M/N!.

According to some aspects, in many cases, N! (e.g., the number of OC groups 104 in data center 108) may be much larger than the number of OCs making this impractical to implement and having to withstand up to (N-1) failures is also not realistic and likely never to happen. For example, for 8 GMs (e.g., GMs 102), the number of OC groups (e.g., OC groups 104) to withstand up to 7 GM failures and to equally balance the PTP connections across the remaining GMs (e.g., GMs 102) may be 8! (e.g., 40320).

As an alternative, a data center 108 may be partitioned into clusters 106 of OCs 103 (e.g., OC groups 104) and GMs 102. For example, cluster 106 may have 4 GMs 102 and the clusters 106 may operate independently of each other (e.g., a GM 102 of a cluster 106 may synchronize only OCs 103 of that cluster and not of other clusters). In this case, the required number of OC groups (e.g., for the cluster) is 4! (e.g., 24) and the number of OCs 103 per OC group 104 is ((M/4)/N!). In such a case, up to 3 failures within a cluster may be handled while providing equal distribution of PTP connections between OCs 103 across all active GMs 102 within the cluster.

Figure 5:
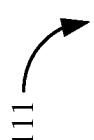
FIG. 5 is a diagram illustrating a UMT with priority values in accordance with aspects of the disclosure.

According to some aspects, OCs 103 synchronized by a failed GM 102 may be redistributed among remaining active GMs (e.g., GMs 102) in a cluster using UMT table priorities. As illustrated in FIG. 5, priorities 116 may be added to the UMT 111. The priorities 116 may be received from a priority database 109 (e.g., see FIGS. 4A and 4B). The UMT 111 may contain a portAddress array 115 of portAddresses 114 of the potential GMs 112. According to some aspects, each OC may contain a UMT. The OC may request unicast Announce messages (e.g., using the REQUEST_UNICAST-_TRANSMISSION TLV in a Signaling message) from the GMs whose IPv6 addresses are in the UMT array and the GMs (e.g., GMs 102) may grant Announce messages. The OC may then invoke the BMCA to select one of the potential GMs (e.g., GMs 102) that has sent Announce messages as the active GM. The selection may be done based on the attributes of each potential GM, e.g., priority1, clockClass, clockAccuracy, offsetScaledLogVariance, priority2, and clockIdentity of the GM as a tiebreaker if all the other attributes of the GMs (e.g., GMs 102) are the same. However, given the same set of potential GMs, different OCs (e.g., OCs 103) may select the same GM, because each OC may see the same attributes for the potential GMs. According to some aspects, with the current UMT, the only way to cause different OCs (e.g., OCs 103) to choose a different potential GM as the actual GM may be to place different IPv6 addresses of the GMs (e.g., GMs 102) in the UMTs of the different OCs. According to some aspects, with this approach, a backup potential GM may not be selected by the BMCA until the actual GM (e.g., GM 102) fails.

According to some aspects, priority1, priority2, GMpriority, etc. may represent priority values of the potential GMs. Clock class may represent a quality level (e.g., boundary clock, ordinary clock, primary, client, etc.) and/or to set a privilege level (e.g., routing, routing-control, etc.) of a potential GM. Clock accuracy may represent a degree of time accuracy or a time accuracy value associated with a potential GM. Offset scaled log-variance may represent an estimate produced by a clock that is not synchronized to another clock. A clock identity may be an identifier associated with a potential GM.

As illustrated in FIG. 5, priority array 117 may be added to the UMT 111 to allow different OCs (e.g., OCs 103) to consider different GMs (e.g., GMs 102) of the index of potential GMs 112 differently. As shown in FIG. 5, the portAddress array 115 may be an array of IPv6 addresses of the potential GMs (e.g., index of potential GMs 112). According to some aspects, a priority array 117 of priorities 116 for GM 102 may be added to the UMT 111, where the $i^{th}$ entry of the priority array 117 is the priority 116 for the potential GM 102 corresponding to the $i^{th}$ IPv6 address of the portAddress array 115. The priority array 117 is shown in FIG. 5, where $p_i$ is the priority 116 for the GM 102 whose IPv6 address is the $i^{th}$ entry of the portAddress array 115. The $p_i$ values may be of type UInteger8.

According to some aspects, Announce messages may be requested from potential GMs (e.g., GMs 102) based on the priority attribute (e.g., where a lower or lowest value of priority is prioritized). If multiple potential GMs (e.g., GMs 102) had the same selected priority value, the BMCA may determine the GM. If no GMs with the selected priority grant Announce messages, the OC may request Announce messages from other GMs (e.g., GMs 102) based on priority value (e.g., GMs 102 with the second-best priority). If none of these grants Announce messages, the OC may make requests of GMs (e.g., GMs 102) with successively lower ranked priorities. According to some aspects, different OCs (e.g., OCs 103) may have different priority values for the various potential GMs. This may enable different OCs (e.g., OCs 103) to favor different GMs (e.g., GMs 102) in different orders of priority. The way the priorities are organized for each OC may allow equal distributions of PTP connections between OCs (e.g., OCs 103) across a set of active GMs (e.g., GMs 102) during normal operations and under failure conditions. According to some aspects, the PTP Unicast Discovery protocol may be modified based on the priorities.

Figure 6:
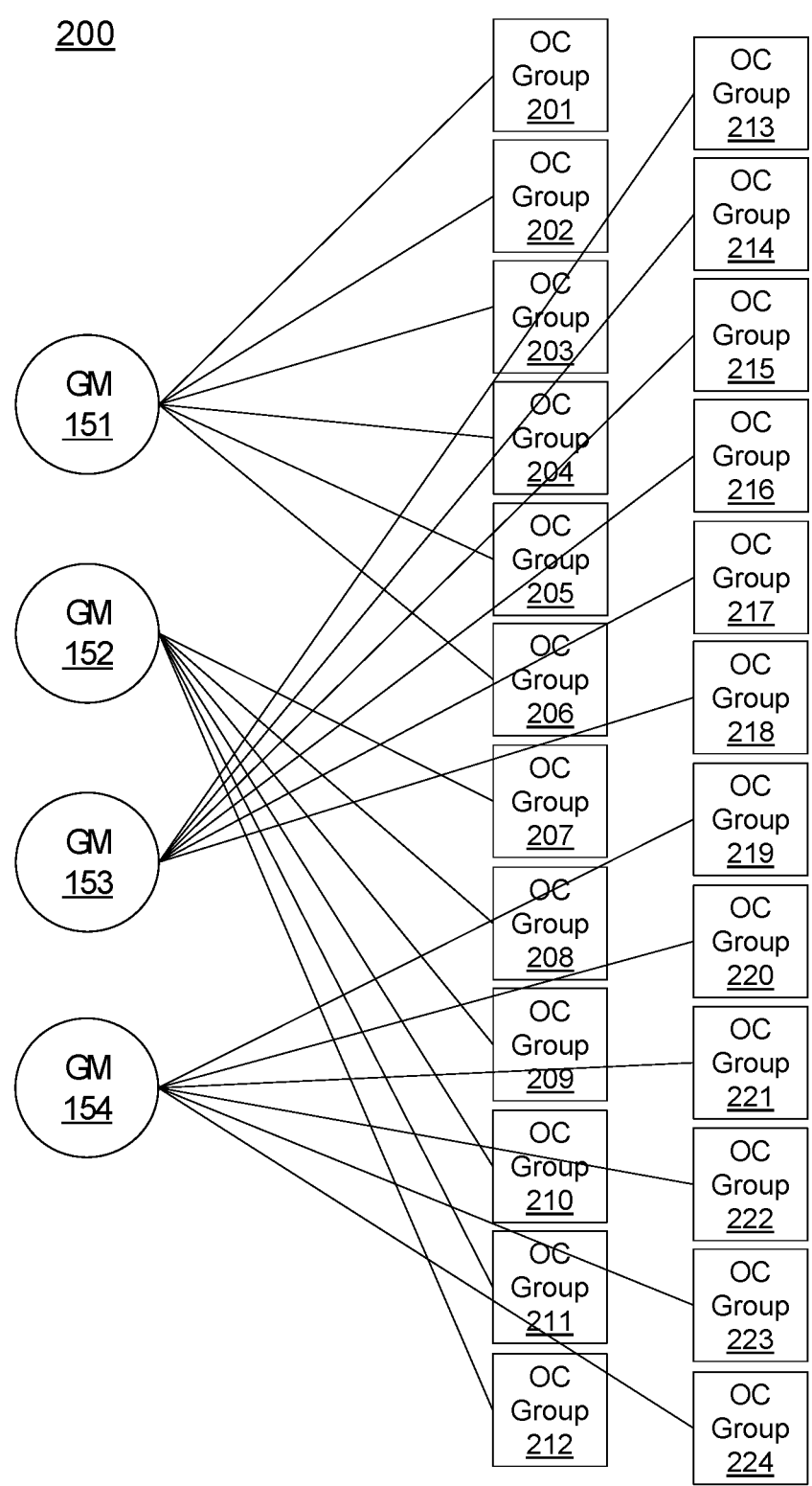
FIG. 6 is a diagram illustrating OC Groups synchronized by respective top priority GMs.

As an example, a cluster of 4 GMs (e.g., GM 151 through GM 154) and 24 OC groups (e.g., OC Group 201 through OC Group 224) may be used to achieve equal numbers of OCs 103 synchronized by each GM 102 after up to 3 failures. According to some aspects, FIG. 6 shows a cluster 200 (e.g., cluster 106 of FIG. 4A) consisting of 4 GMs (e.g., GM 151, GM 152, GM 153, and GM 154) with 4!=24 groups (OC Group 201 through OC Group 224) of OCs 103 synchronized by the respective best priority GM, e.g., based on priorities given in Table 1 below. The number of OCs (e.g., OCs 103) in each of the OC groups may be dependent on the number of OCs (e.g., OCs 103) within each cluster 106.

In an example, the unicast master table priorities for the OCs (e.g., OCs 103) in each group are shown in Table 1.

TABLE 1

UMT priorities for OCs 103 in each group, for the case
of 4 GMs (e.g., GM 151, GM 152, GM 153, and GM 154)
and 24 OC groups (OC Group 201 through OC Group 224).

| OC Group | Best GM (GM with priority 0) | $2^{nd}$ best GM (GM with priority 1) | $3^{rd}$ best GM (GM with priority 2) | $4^{th}$ best GM (GM with priority 3) |
|---|---|---|---|---|
| 201 | GM 151 | GM 152 | GM 153 | GM 154 |
| 202 | GM 151 | GM 152 | GM 154 | GM 153 |
| 203 | GM 151 | GM 153 | GM 152 | GM 154 |
| 204 | GM 151 | GM 153 | GM 154 | GM 152 |
| 205 | GM 151 | GM 154 | GM 152 | GM 153 |
| 206 | GM 151 | GM 154 | GM 153 | GM 152 |
| 207 | GM 152 | GM 151 | GM 153 | GM 154 |
| 208 | GM 152 | GM 151 | GM 154 | GM 153 |
| 209 | GM 152 | GM 153 | GM 151 | GM 154 |
| 210 | GM 152 | GM 153 | GM 154 | GM 151 |
| 211 | GM 152 | GM 154 | GM 151 | GM 153 |
| 212 | GM 152 | GM 154 | GM 153 | GM 151 |
| 213 | GM 153 | GM 151 | GM 152 | GM 154 |
| 214 | GM 153 | GM 151 | GM 154 | GM 152 |
| 215 | GM 153 | GM 152 | GM 151 | GM 154 |
| 216 | GM 153 | GM 152 | GM 154 | GM 151 |
| 217 | GM 153 | GM 154 | GM 151 | GM 152 |
| 218 | GM 153 | GM 154 | GM 152 | GM 151 |
| 219 | GM 154 | GM 151 | GM 152 | GM 153 |
| 220 | GM 154 | GM 151 | GM 153 | GM 152 |
| 221 | GM 154 | GM 152 | GM 151 | GM 153 |
| 222 | GM 154 | GM 152 | GM 153 | GM 151 |
| 223 | GM 154 | GM 153 | GM 151 | GM 152 |
| 224 | GM 154 | GM 153 | GM 152 | GM 151 |

Table 1 illustrates that if 3 of the 4 GMs fail, all the OC groups switch to the remaining GM that has not failed. Moreover, Table 1 illustrates that the reason the uniform distribution of OC Groups across the four GMs is obtained after a failure is that the UMTs of the 24 groups contain the possible permutations of the four GM priorities. To satisfy this condition and minimize implementation complexity, the number of OC groups must be N! if there are N GMs dividing the GMs into a set of independent clusters. The UMT priority array of each OC can be generated by creating all permutations of, for example, (0, 1, 2, 3).

In the unicast negotiation feature of IEEE Std 1588-2019, different OCs (e.g., OCs 103) may not consider different potential GMs. For example, each OC may request Announce messages from each GM in its UMT and the BMCA may consider the GMs (e.g., GMs 102) in the same manner using the same set of attributes that are associated with each GM.

According to some aspects, this problem may be addressed by adding priorities to the UMT and having each OC request Announce messages from the highest priority GMs. For example, each OC may request Announce messages exclusively from the highest priority GMs. Since the priorities could be configured differently in each OC, each OC may request Announce messages from different potential GMs. However, this method may not be able to distinguish potential GMs 102 that might have higher or lower ranked attributes (e.g., clockClass) compared to an active GM 102 that was selected based on the UMT highest priority.

According to some aspects, OCs (e.g., OCs 103) synchronized by a failed GM may be redistributed among remaining active GMs (e.g., GMs 102) in a cluster using GmPriority table values using A-BMCA. For example, each OC may request Announce messages from ALL the potential GMs in the UMT. The potential GMs that reply with Announce messages may then distinguished by modifying the BMCA (e.g., defining an alternate BMCA, such as A-BMCA). The A-BMCA may be based on the default BMCA with the addition of a new GmPriority attribute. The GmPriority attribute may be a table of priorities (e.g., as illustrated in FIG. 5). According to some aspects, the table of priorities may be implemented via the UMT or clockIdentity.

FIG. 6 shows the "best" priority GM for each OC Group. For example, since every permutation of the four priorities is present in Table 1, each GM synchronizes 6 OC Groups. The result is a uniform distribution of the OC Groups among the GMs. GM 151 synchronizes OC Groups 201 to 206, GM 152 synchronizes OC Groups 207 to 212, GM 153 synchronizes OC Groups 213 to 218, and GM 154 synchronizes OC Groups 219 to 224.

Figure 7:
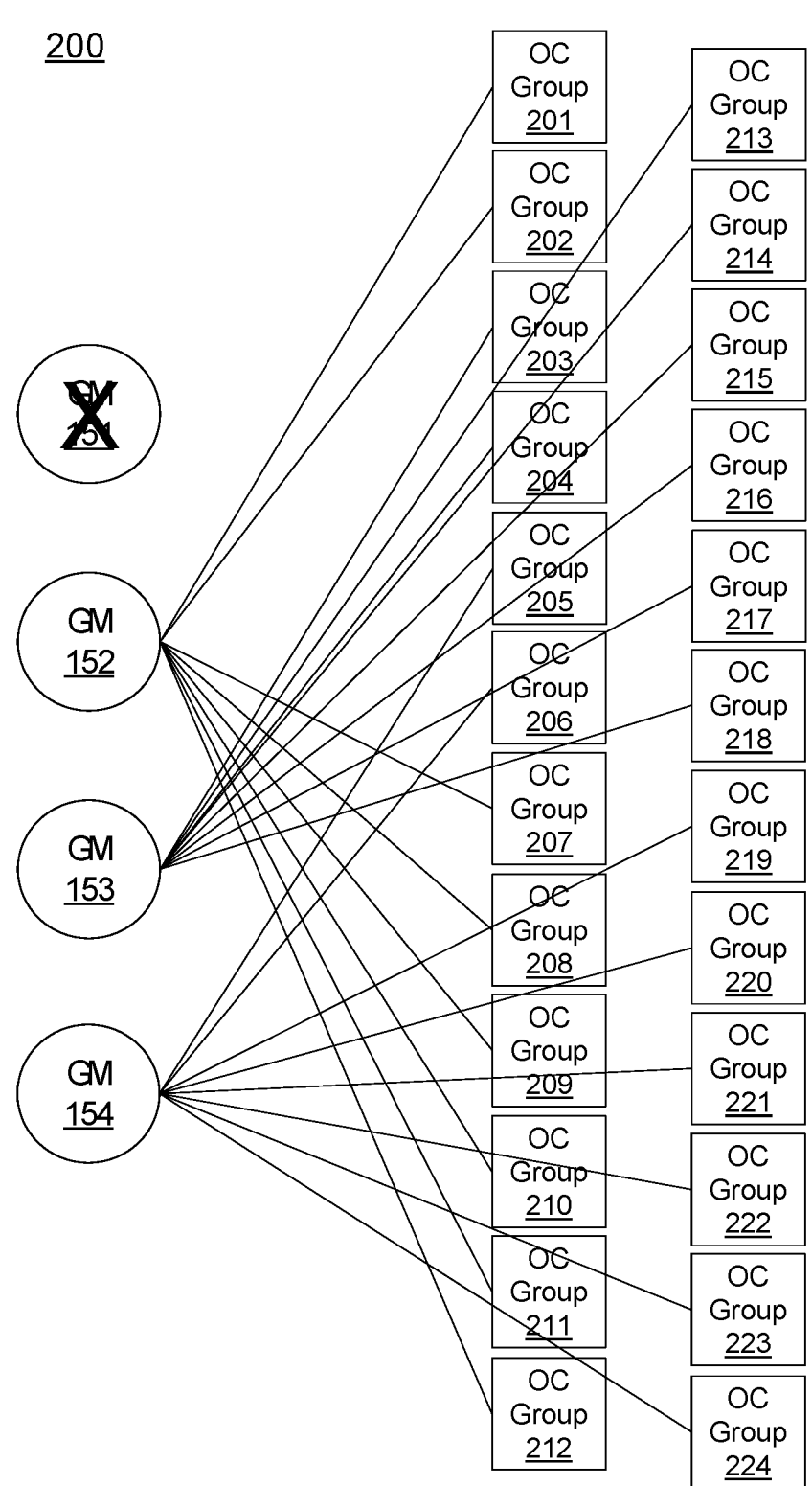
FIG. 7 is a diagram illustrating OC Groups synchronized by respective top priority GMs.

FIG. 7 shows an example where OC Groups 201-224 are synchronized by the respective best priority GM (e.g., based on priorities given in Table 1) for the case where GM 151 has failed. Based on Table 1, OC Groups 201 to 206 (e.g., which were previously synchronized by GM 151) may switch to the next (e.g., second-best) GMs in their UMTs. This is GM 152 for OC Groups 201 and 202, GM 153 for OC Groups 203 and 204, and GM 154 for OC Groups 205 and 206. After the failure, each remaining GM synchronizes 8 of the OC Groups (instead of 6 originally), and the distribution of OC Groups across the GMs is still uniform and the PTP connections are equally balanced across the remaining 3 GMs. GM 152 synchronizes OC Groups 201, 202, and 207 to 212, GM 153 synchronizes OC Groups 203, 204, and 213 to 218, and GM 154 synchronizes OC Groups 205, 206, and 219 to 224.

According to some aspects, FIG. 7 shows a case where GM 151 has failed. After the failure, the OCs (e.g., OCs 103) of Groups 1 to 6 (e.g., which were previously synchronized by GM 151) may request Announce messages from the GMs (e.g., GMs 152, 153, and 154). If the GMs (e.g., GMs 102) grant Announce messages, the BMCA results in the second-best potential GM, as determined by the GmPriority value, becoming the GM for the OCs (e.g., OCs 103) of each respective OC group 104. Based on Table 1, the second-best GM is GM 152 for OC Groups 201 and 202, GM 153 for OC Groups 203 and 204, and GM 154 for OC Groups 205 and 206. After the BMCA has been run in the OCs (e.g., some or all), each remaining GM synchronizes 8 of the OC Groups, and the distribution of OC Groups across the GMs is still uniform and the PTP connections are equally balanced across the remaining GMs. GM 152 synchronizes OC Groups 201, 202, and 207 to 212, GM 153 synchronizes OC Groups 203, 204, and 213 to 218, and GM 154 synchronizes OC Groups 205, 206, and 219 to 224.

Figure 8:
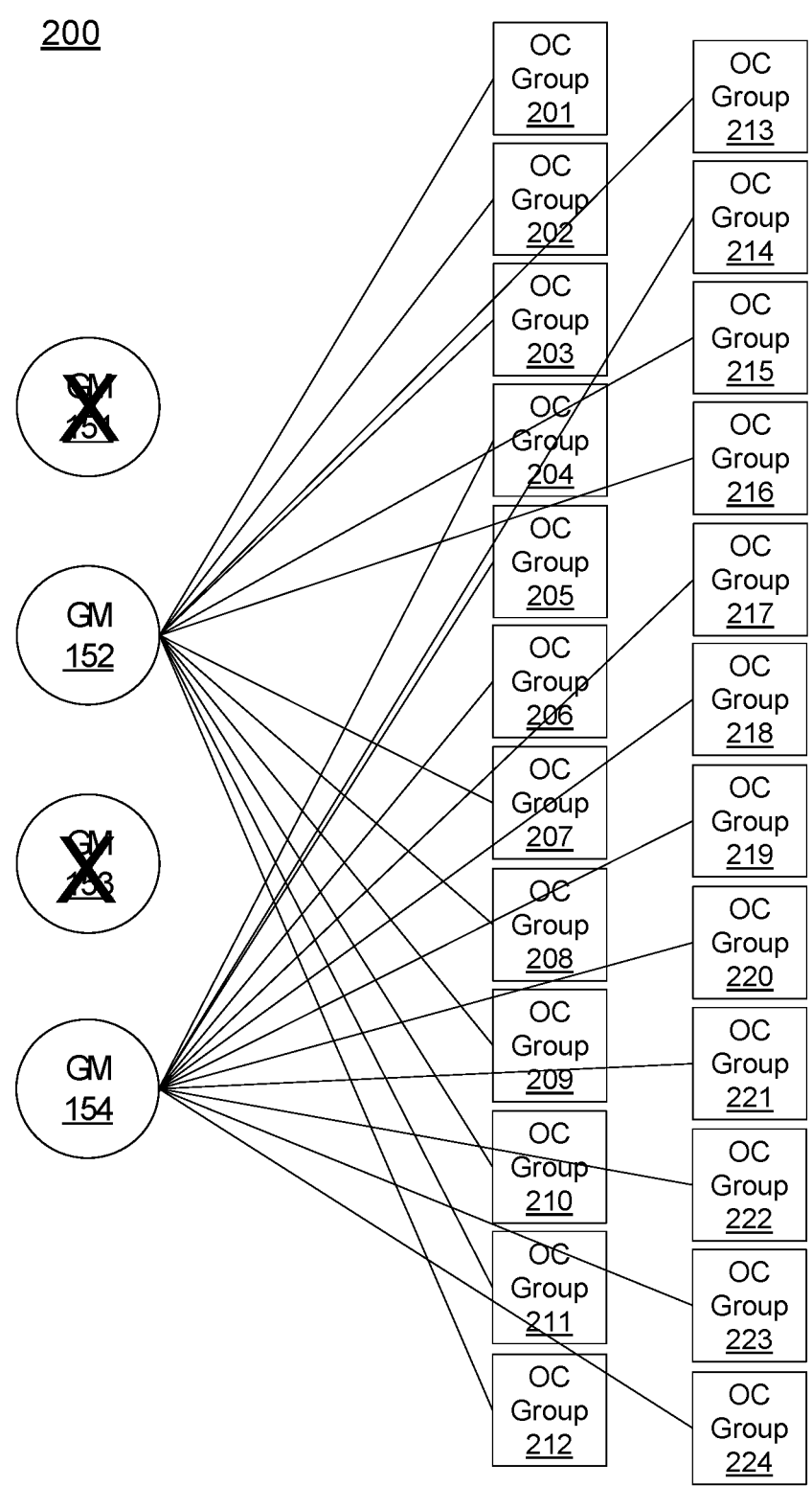
FIG. 8 is a diagram illustrating OC Groups synchronized by respective top priority GMs.

According to some aspects, if there are 4 GMs 102 and 24 OC groups, and if the GmPriority values (in the UMT or the clockIdentity table) are configured as in Table 1, the BMCA may result in the OCs (e.g., OCs 103) being distributed among the GMs (e.g., GMs 102) (e.g., as shown in FIG. 8). As shown in FIG. 8, the OCs of each group may be synchronized by the GM with the best GmPriority for that group.

Moreover, since every permutation of the four GmPriority values is present in Table 1, each GM may synchronize 6 OC Groups (e.g., ¼ of the 24 OC Groups). The result is a uniform distribution of the OC Groups among the GMs. GM 151 synchronizes OC Groups 201 to 206, GM 152 synchronizes OC Groups 207 to 212, GM 153 synchronizes OC Groups 213 to 218, and GM 154 synchronizes OC Groups 219 to 224.

FIG. 8 shows an example where OC Groups 201-224 are synchronized by the respective best priority GM, based on priorities given in Table 1, for the case where GM 151 and GM 153 have failed. Assuming GM 151 has failed first, then based on Table 1, OC Groups 203, 213, 215, and 216, which were previously synchronized by GM 153 (e.g., see FIG. 7), switch to GM 152. OC Groups 204, 214, 217, and 218, which were previously synchronized by GM 153 (e.g., see FIG. 7) switch to GM 154. After the failure, each remaining GM synchronizes 12 of the OC Groups, and the distribution of OC Groups across the GMs (e.g., GMs 102) is still uniform. GM 152 synchronizes OC Groups 201, 202, 203, 207 to 212, 213, 215, and 216, while GM 154 synchronizes OC Groups 204, 205, 206, 214, and 217 to 224. Note that the same final configuration may result if GM 153 fails first, followed by GM 151.

According to some aspects, equal distribution of PTP connections between OCs (e.g., OCs 103) may be achieved amongst a set of potential GMs (e.g., GMs 102) within a cluster. For example, the GMs (e.g., GMs 102) that are selected to provide synchronization to the OCs (e.g., OCs 103) may be determined by the A-BMCA algorithm running in each OC. For example where each GM (e.g., GM 151, GM 152, GM 153, GM 154, etc.) may send Announce messages with the same set of attributes having the same values (e.g., GMs sending with priority 1=128 and clock-Class=6), the A-BMCA running in each OC may default to the use of GmPriority to decide which GM to synchronize to and equal distribution may be achieved. Assuming the OC Groups 201 to 206 are synchronized to GM 151 and clock-Class of GM 151 changes from 6 to 7 while clockClass of GM 152, GM 153, GM 154 stays at 6, OCs within OC Group 201 to 206 will be redistributed to GM 152, GM 153, GM 154 according to the priorities in Table 1. In such case, the same result may be produced when a GM fails (e.g., hard failure) or when a GM degrades in performance (e.g., lower clock Class).

Figure 9:
FIG. 9 is a diagram illustrating a UMT in accordance with aspects of the disclosure.

Some aspects may redistribute OCs (e.g., OCs 103) synchronized by a failed GM among remaining active GMs in a cluster using GmPriority table values using A-BMCA. According to some aspects, UMT 121, with the GmPriority entries 118 forming a GmPriority array 119, is shown in FIG. 9. The $i^{th}$ entry of the table includes the portAddress 114 (e.g., IPv6 address) and the GmPriority for that potential GM, where $p_i$ is the GmPriority for the corresponding potential GM. The $p_i$ values could be of type UInteger8. The value $p_1$ reflects the best GM, $p_2$ is the second-best, and so on.

According to some aspects, each OC may request Announce messages from more than one of the potential GMs (e.g., all of the potential GMs) in the UMT. In some other aspects, each OC may request Announce from only the GM with the highest priority. According to some aspects, the data set comparison algorithm of the default BMCA may be modified to compare GmPriority values after the priority2 value comparison and before the tiebreaker GM Identity comparison, of the two potential GMs being compared. For example, the modified data set comparison algorithm (e.g., including the GmPriority attribute) is shown in FIG. 10 (e.g., step 140).

Figure 10:
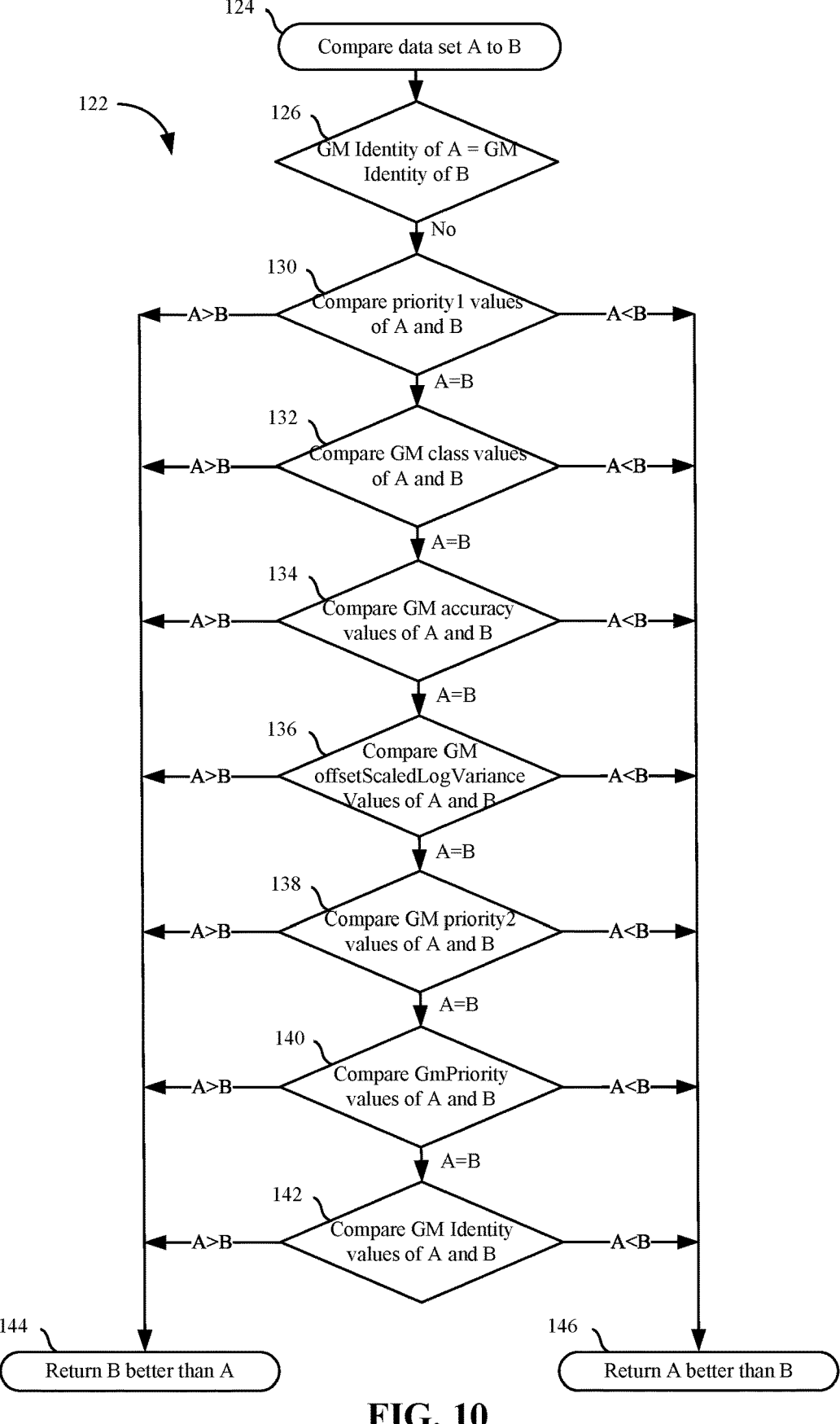
FIG. 10 is a diagram of a process for comparing data sets in accordance with aspects of the disclosure.

According to some aspects, FIG. 10 illustrates an example flowchart 122 illustrating operations for comparison of data sets A and B. According to some aspects, the comparison may include a comparison of alternate BMCA and/or a comparison of GmPriority values.

At operation 124, a comparison of data set A to B may begin. At operation 126, a GM Identity of data set A may be compared to a GM identity of data set B. If the GM Identity of data set A is not equal to the GM identity of data set B at operation 126, the comparison may continue to operation 130.

At operation 130, a priority1 value of data set A may be compared to a priority1 value of data set B. If the priority1 value of data set A is greater than the priority1 value of data set B at operation 130, the comparison may end at operation 144, returning data set B is "better" (e.g., ranked higher) than data set A. If the priority1 value of data set A is less than the priority1 value of data set B at operation 130, the comparison may end at operation 146, returning data set A is "better" (e.g., ranked higher) than data set B. If the priority1 value of data set A is equal to the priority1 value of data set B at operation 130, the comparison may continue to operation 132.

At operation 132, a GM class value of data set A may be compared to a GM class value of data set B. If the GM class value of data set A is greater than the GM class value of data set B at operation 132, the comparison may end at operation 144, returning data set B is "better" (e.g., ranked higher) than data set A. If the GM class value of data set A is less than the GM class value of data set B at operation 132, the comparison may end at operation 146, returning data set A is "better" (e.g., ranked higher) than data set B. If the GM class value of data set A is equal to the GM class value of data set B at operation 132, the comparison may continue to operation 134.

At operation 134, a GM accuracy value of data set A may be compared to a GM accuracy value of data set B. If the GM accuracy value of data set A is greater than the GM accuracy value of data set B at operation 134, the comparison may end at operation 144, returning data set B is "better" (e.g., ranked higher) than data set A. If the GM accuracy value of data set A is less than the GM accuracy value of data set B at operation 134, the comparison may end at operation 146, returning data set A is "better" (e.g., ranked higher) than data set B. If the GM accuracy value of data set A is equal to the GM accuracy value of data set B at operation 134, the comparison may continue to operation 136.

At operation 136, a GM 102 offsetScaledLogVariance value of data set A may be compared to a GM offsetScaled-Log Variance value of data set B. If the GM offsetScaled-LogVariance value of data set A is greater than the GM offsetScaledLogVariance value of data set B at operation 136, the comparison may end at operation 144, returning data set B is "better" (e.g., ranked higher) than data set A. If the GM offsetScaledLogVariance value of data set A is less than the GM offsetScaledLogVariance value of data set B at operation 136, the comparison may end at operation 146, returning data set A is "better" (e.g., ranked higher) than data set B. If the GM offsetScaledLogVariance value of data set A is equal to the GM offsetScaledLogVariance value of data set B at operation 136, the comparison may continue to operation 138.

At operation 138, a GM 102 priority2value of data set A may be compared to a GM priority2 value of data set B. If the GM priority2 value of data set A is greater than the GM priority2 value of data set B at operation 138, the comparison may end at operation 144, returning data set B is "better" (e.g., ranked higher) than data set A. If the GM priority2 value of data set A is less than the GM priority2 value of data set B at operation 138, the comparison may end at operation 146, returning data set A is "better" (e.g., ranked higher) than data set B. If the GM priority2 value of data set A is equal to the GM 102 priority2 value of data set B at operation 138, the comparison may continue to operation 140.

Because a list of GM priorities may be added to the UMT (e.g., where the value of each priority is the priority for the potential GMs), at operation 140, a GmPriority value of data set A may be compared to a GmPriority value of data set B. For example, a lower or lowest value of priority may be preferrable for connecting. If the GmPriority value of data set A is greater than the GmPriority value of data set B at operation 140, the comparison may end at operation 144, returning data set B is "better" (e.g., ranked higher) than data set A. If the GmPriority value of data set A is less than the GmPriority value of data set B at operation 140, the comparison may end at operation 146, returning data set A is "better" (e.g., ranked higher) than data set B. If the GmPriority value of data set A is equal to the GmPriority value of data set B at operation 140, the comparison may continue to operation 142.

At operation 142, a GM Identity value of data set A may be compared to a GM Identity value of data set B. If the GM Identity value of data set A is greater than the GM Identity value of data set B at operation 142, the comparison may end at operation 144, returning data set B is "better" (e.g., ranked higher) than data set A. If the GM Identity value of data set A is less than the GM 102 Identity value of data set B at operation 142, the comparison may end at operation 146, returning data set A is "better" (e.g., ranked higher) than data set B.

According to some aspects, the GmPriority values may be included in the UMT rather than being in a new table. The priorities (e.g., GmPriority values) may be associated with GMs (e.g., GMs 102) and the portAddress 114 may indicate this association. In some aspects, if the clockIdentities of the potential GMs are known in advance, then a new table may be defined. For example, the potential GMs may be identified by clockIdentity. According to some aspects, FIG. 11 shows a clockIdentity table 180 (e.g., a GmPriority table) with an index of potential GMs 112, GM clockIdentity entries 182 forming GM clockIdentity array 183, and GmPriority entries 118 forming GmPriority array 119.

According to some aspects, if the clockIdentity table is used, then the UMT may not need the GmPriority entries. When an Announce message is received, the UMT or the clockIdentity tables may be used to obtain the GmPriority of the potential GM indicated by the Announce message. If the UMT is used, the potential GM may be identified by the source IP address of the IP packet that contained the Announce message, and the respective GmPriority may be obtained from the UMT. If the clockIdentity table is used, the potential GM may be identified by the grandmasterIdentity field of the Announce message, and the respective GmPriority may be obtained from the clockIdentity table.

According to some aspects, an OC may request Announce messages from the potential GMs 102 in the UMT. For example, the OC may request Announce messages from every potential GM 102 in the UMT. The OC may be granted Announce messages by the OCs (e.g., some or all). The OC may use the received Announce messages in the BMCA. According to some aspects, assuming the GMs 102 (e.g., some or all) have the same values, for example priority1, clockClass, clockAccuracy, offsetScaledLogVariance, and priority2, the best GM 102 may be chosen based on the GmPriority values. Since the GmPriority table values can be different in each OC, different OCs 103 may be enabled to favor different GMs 102 in different orders of priority with the objective of achieving equal distribution of PTP connections between OCs 103 amongst the set of active GMs (e.g., GMs 102) in a cluster. In the case of four GMs and 24 OC groups, if the GmPriority values are configured as in Table 1, equal distribution of the OCs (e.g., OCs 103) among the GMs may be obtained. In addition, if one, two, or three GMs fail, the OCs whose GMs have failed may make new requests of Announce messages from the remaining GMs. After the requests are granted and Announce messages are sent, the OCs may invoke the A-BMCA, and new GMs may be determined based on the GmPriority values. Equal distribution of OCs (e.g., OCs 103) among the GMs (e.g., GMs 102) may be maintained.

According to some aspects, equal distribution within a GM cluster group may be guaranteed if the number of OC groups is N!, where N is the number of GMs (e.g., GMs 102) per cluster. In the case of 4 GMs organized in a cluster, the number of OC groups is 24 and, in such case, equal distribution can be guaranteed up to 3 GM failures. FIG. 12 illustrates an example method 1200 for achieving redundancy and load balancing when synchronizing time for PTP connections within a network. In step 1210, a PTP cluster for load balancing is determined. The PTP clusters may include one or more PTP GMs and/or one or more PTP OC groups.

In step 1220, it may be determined that the PTP cluster corresponds to a PTP ordinary OC. The PTP OC may include a UMT. Moreover, in step 1220, it may be determined that the PTP OC corresponds to a PTP OC group of the PTP OC groups. For example, the PTP cluster may map the PTP OC to the PTP OC group. The UMT may include port addresses associated with one or more of the PTP GMs and one or more PTP GM priority attributes.

In step 1230, a first PTP GM of the PTP GMs for the PTP OC may be determined. The first PTP GM may be determined by a BMCA based on the one or more PTP GM priority attributes.

In step 1240, the time for the PTP connections within the network may be synchronized. Moreover, the PTP connections may be synchronized based on the first PTP GM.

Various aspects of the disclosure may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for achieving redundancy and load balancing when synchronizing time for PTP connections within a network including the particular steps of the method of FIG. 12, this disclosure contemplates any suitable method for synchronizing time for PTP connections within a network including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

The foregoing description been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe aspects in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Aspects also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Aspects also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure is intended to be illustrative, but not limiting, of the scope of the patent rights, which is set forth in the following claims.

What is claimed:

1. A method for achieving redundancy and load balancing when synchronizing time for precision time protocol (PTP) connections within a network, the method comprising:

determining a PTP cluster for load balancing, the PTP clusters comprising PTP Grandmasters (GMs) and PTP ordinary clock (OC) groups, wherein the PTP GMs comprises a first PTP GM, and wherein the PTP OC groups comprise a first PTP OC group and a PTP OC;

determining the PTP cluster corresponds to the PTP OC and the first PTP OC group, wherein the PTP OC comprises a unicast master table (UMT) and the UMT comprises port addresses associated with one or more of the PTP GMs and one or more PTP GM priority attributes, wherein the one or more PTP GM priority attributes are configured to achieve equal distribution of the PTP OC groups across the PTP GMs within the PTP cluster;

selecting, for the PTP OC, by a Master Clock Mechanism based on the one or more PTP GM priority attributes, the first PTP GM; and synchronizing, based on the first PTP GM, the time for the PTP connections within the network.

2. The method of claim 1, further comprising requesting, by the PTP OC based on the one or more PTP GM priority attributes, a unicast announce message from the first PTP GM.

3. The method of claim 1, further comprising selecting, by the Master Clock Mechanism until the first PTP GM fails and based on the one or more PTP GM priority attributes, a second PTP GM.

4. The method of claim 1, wherein the first PTP GM is determined based on a first PTP GM priority attribute of the one or more PTP GM priority attributes having a lowest value of the one or more PTP GM priority attributes.

5. The method of claim 1, wherein the UMT comprises a pointer, further comprising choosing, by the PTP OC based on the pointer, a unique PTP GM network address.

6. The method of claim 1, further comprising requesting, by the PTP OC, an announce message from the first PTP GM to be analyzed by the Master Clock Mechanism.

7. The method of claim 1, further comprising determining an alternate Master Clock Mechanism based on a local PTP GM priority attribute.

8. The method of claim 7, wherein the local PTP GM priority attribute comprises a table of local PTP GM priorities.

9. The method of claim 1, wherein the PTP GMs, PTP OC Groups, or PTP OCs are located in a data center.

10. A non-transitory computer-readable medium storing instructions for achieving redundancy and load balancing when synchronizing time for precision time protocol (PTP) connections within a network, the instructions that, when executed, cause:

determining a PTP cluster for load balancing, the PTP clusters comprising PTP Grandmasters (GMs) and PTP ordinary clock (OC) groups, wherein the PTP GMs comprises a first PTP GM, and wherein the PTP OC groups comprise a first PTP OC group and a PTP OC;

determining the PTP cluster corresponds to the PTP OC and the first PTP OC group, wherein the PTP OC comprises a unicast master table (UMT) and the UMT comprises port addresses associated with one or more of the PTP GMs and one or more PTP GM priority attributes, wherein the one or more PTP GM priority attributes are configured to achieve equal distribution of the PTP OC groups across the PTP GMs within the PTP cluster;

selecting, for the PTP OC, by a Master Clock Mechanism based on the one or more PTP GM priority attributes, the first PTP GM; and synchronizing, based on the first PTP GM, the time for the PTP connections within the network.

11. The non-transitory computer-readable medium of claim 10, wherein the instructions, when executed, further cause requesting, by the PTP OC based on the one or more PTP GM priority attributes, a unicast announce message from the first PTP GM.

12. The non-transitory computer-readable medium of claim 10, wherein the instructions, when executed, further cause selecting, by the Master Clock Mechanism until the first PTP GM fails and based on the one or more PTP GM priority attributes, a second PTP GM.

13. The non-transitory computer-readable medium of claim 10, wherein the first PTP GM is determined based on a first PTP GM priority attribute of the one or more PTP GM priority attributes having a lowest value.

14. The non-transitory computer-readable medium of claim 10, wherein the UMT comprises a pointer, further comprising choosing, by the PTP OC based on the pointer, a unique PTP GM network address.

15. The non-transitory computer-readable medium of claim 10, wherein the instructions, when executed, further cause requesting, by the PTP OC, an announce message from the first PTP GM to be analyzed by the Master Clock Mechanism.

16. The non-transitory computer-readable medium of claim 10, wherein the instructions, when executed, further cause determining an alternate Master Clock Mechanism based on a local PTP GM priority attribute.

17. The non-transitory computer-readable medium of claim 16, wherein the local PTP GM priority attribute comprises a table of local PTP GM priorities.

18. The non-transitory computer-readable medium of claim 10, wherein the PTP GMs are located in a data center.

19. A device for achieving redundancy and load balancing when synchronizing time for precision time protocol (PTP) connections within a network, the device comprising:

one or more processors; and a non-transitory memory including computer-executable instructions, which when executed by the processor, cause the device to at least:

determine a PTP cluster for load balancing, the PTP clusters comprising PTP Grandmasters (GMs) and PTP ordinary clock (OC) groups, wherein the PTP GMs comprises a first PTP GM, and wherein the PTP OC groups comprise a first PTP OC group and a PTP OC;

determine the PTP cluster corresponds to the PTP OC and the first PTP OC group, wherein the PTP OC comprises a unicast master table (UMT) and the UMT comprises port addresses associated with one or more of the PTP GMs and one or more PTP GM priority attributes, wherein the one or more PTP GM priority attributes are configured to achieve equal distribution of the PTP OC groups across the PTP GMs within the PTP cluster;

select, for the PTP OC, by a Master Clock Mechanism based on the one or more PTP GM priority attributes, the first PTP GM; and synchronize, based on the first PTP GM, the time for the PTP connections within the network.

20. The device of claim 19, wherein the instructions, when executed by the processors, further cause the device to select, by the Master Clock Mechanism until the first PTP GM fails and based on the one or more PTP GM priority attributes, a second PTP GM.

* * * * *